(No Model.)
H. PACKER.
PORTABLE HORSE POWER.
No. 297,289. Patented Apr. 22, 1884.
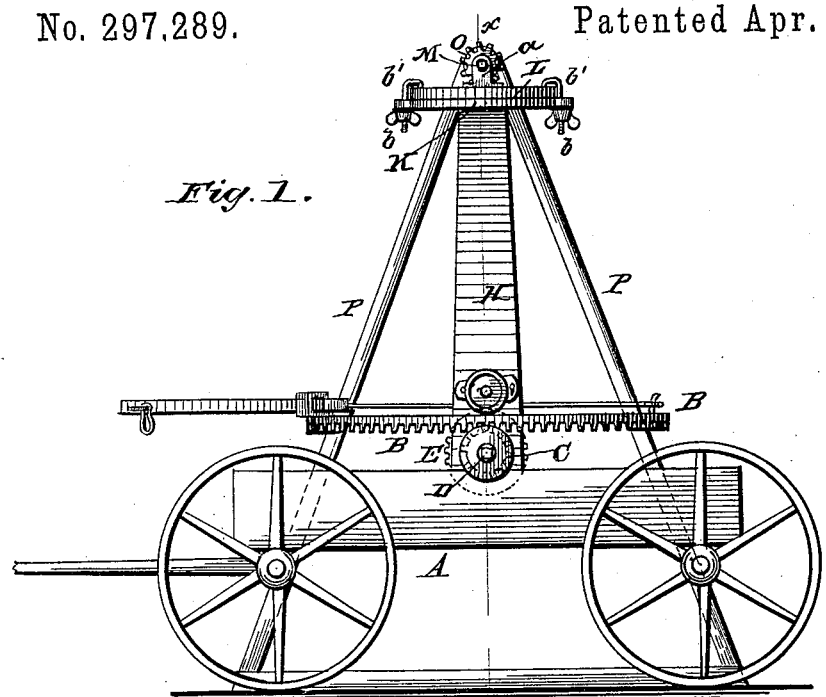
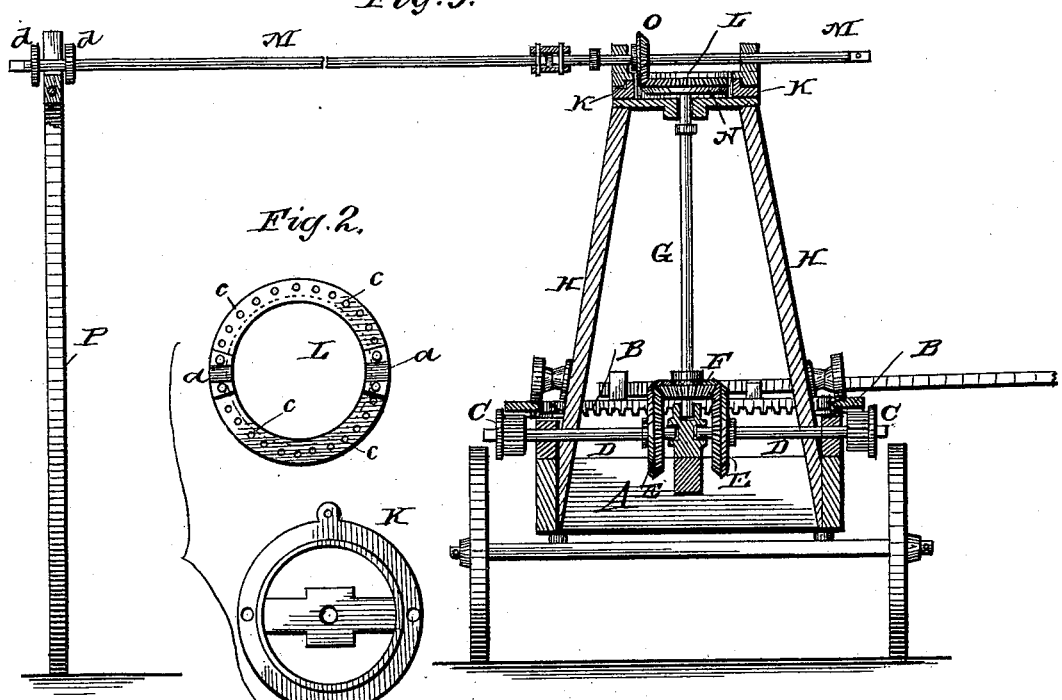
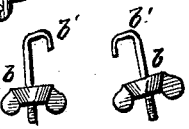
WITNESSES
INVENTOR
Harvey Packer
by
Marahan & Ward, Attorneys

UNITED STATES PATENT OFFICE.

HARVEY PACKER, OF ROCK FALLS, ILLINOIS.

PORTABLE HORSE-POWER.

SPECIFICATION forming part of Letters Patent No. 297,289, dated April 22, 1884.

Application filed March 14, 1884. (No model.)

*To all whom it may concern:*

Be it known that I, HARVEY PACKER, a citizen of the United States, residing at Rock Falls, in the county of Whiteside and State of Illinois, have invented certain new and useful Improvements in Portable Horse-Powers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention pertains to that class of horse-powers in which the tumbling-rod is placed at such altitude that the horses may pass under it; and it consists in certain novel mechanism by which such tumbling-rod can be sustained and operated at such desired elevation and yet such horse-power be rendered portable. The placing of the tumbling-rod over the horses and the rendering the power portable are both very desirable elements, and it is difficult to decide which is the more advantageous. A tumbling-rod placed where the horses, in making their circuit, are compelled, in each circuit, to step over it, causes the horses to slacken their draft, and thereby about ten per cent. of the draft is lost, which, in a ten-horse power, is equal to the draft of one horse, and proportionate to the number of horses used. Again, a low or down tumbling-rod is dangerous to persons working in its vicinity, and it also is likely to gather and wind upon itself straw or refuse contiguous to it. Again, the machinery to be driven is usually at some altitude from the ground, which necessitates the angling upward of the tumbling-rod after the latter leaves the path of the horses, and this, working the rod at an angle, increases the friction, and necessarily the labor required to operate it, and in mounted powers the tumbling-rod must be angled down to permit the horses to pass over it, and then upward to the machinery, making two angles.

In horse-powers having overhead tumbling-rods, as heretofore constructed, the gearing for attaining the essential velocity has been placed some distance above the horses, and nearly or quite on the plane of the tumbling-rod. This construction put the weight of such gearing so high as to require lateral bracing and support, and thereby rendered it impracticable to have such powers in a portable condition, and in such construction no bracing but to some stationary frame or building was feasible, and such powers were used only when attached to some building or permanently-located frame, whereby the necessary amount of bracing could be obtained. Portability in a horse-power is one of its most valuable incidents, insomuch that large classes of machinery driven thereby—such as thrashers, hullers, shellers, and saws—are necessarily moved about to bring them to the material upon which they are to operate. A stationary grain-thrasher or corn-sheller would be substantially valueless, for the reason that it would be too expensive and troublesome to bring the grain or corn to it, and therefore such transfer is substantially impracticable. In my invention it has been my aim to so construct and relatively locate the machinery of the horse-power that the tumbling-rod may have the advantage of the necessary elevation, while the bulk of the gearing, and thereby the weight of the power, is placed so low that it is rendered feasible to operate such power independent of any lateral support or bracing (other than such as is used with portable powers) and mount the same on wheels in condition to be portable. An additional advantage is the provision of an adjustable disk carrying the inner end of the tumbling-rod or overhead shaft, so that the latter may be turned in any direction to accommodate itself to various locations of the machinery to be operated. Another advantageous improvement is, that while in upright horse-powers, as heretofore constructed, the sweeps to which the team was attached had their inner ends attached directly or indirectly to the upright shaft, and thereby room for but one to four horses was afforded, in my power I use the ordinary master-wheel, and can attach as many as ten or twelve horses, if desired. Therefore my upright power, instead of being limited, as those heretofore, to such light work as one to four horses could do, is applicable also to heavy work—such as usually is accomplished by eight, ten, or twelve horses. Again, I actuate the pinion on the lower end of the upright shaft by bevel-gears on opposite sides thereof, running in contrary directions, and thereby get a steadier motion and avoid the friction occasioned heretofore by driving such pinion from one side, and thereby forcing it constantly against the opposite side of its lower bearing.

In the drawings, Figure 1 is a side elevation of a power embodying my invention. Fig. 2 is a detailed view of the adjustable cap or disk which carries the inner end of the tumbling-rod. Fig. 3 is a transverse vertical section on line x x, Fig. 1.

A is the frame of the power, suitably mounted on trucks for convenience in moving.

B is a large horizontal wheel, to which the draft is applied, and having cogs on its lower face, which engage and actuate the pinions C C, located on opposite sides of and beneath the wheel B. The pinions C C are respectively rigidly attached to the independent shafts D D. On the inner ends of the shafts D D are rigidly affixed the bevel-gear wheels E E, which latter engage and operate the pinion F, rigidly seated on the upright shaft G. It will be observed that the pinions C C and bevel-gears E revolve in opposite directions, the shafts D D being journaled independently of each other. By this means the pinion F on the vertical shaft G is driven from opposite sides, and the outward pressure of each gear E met and neutralized by that of the other gear E, and thereby lateral strain, and consequent friction, at the lower journal of the shaft G is obviated.

H H are upright posts, suitably attached at their lower ends to the frame A, and supporting at their upper ends the horizontal circular disk K. The posts H also support the vertical shaft G, which, near its upper end, has a box-connection with such posts. One post H can be used, in which case the upper part of the vertical shaft G would have a box-connection on the inner face of such post, or would be otherwise suitably journaled to a bearing attached to such post. On the disk K is seated the annular plate L, to the upper side of which latter the tumbling rod or shaft M is journaled by means of journal-boxes a a attached to such plate L. Motion and power are communicated to the shaft M by means of the horizontal bevel-gear wheel N, keyed in the upper end of the shaft G, which wheel N engages and actuates a bevel pinion, O, fixed on the rod or shaft M. The plate L is held in place and the direction of the rod M rendered changeable by the following provision:

Suitably attached to the disk K are bolts b b, provided with thread and thumb-nuts at their lower ends and hooks b' at their upper ends, and such hooks b' are respectively inserted at opposite sides in one of an annular series of vertical holes, c, formed in the upper surface of the plate L. By loosening the bolts b and withdrawing them from the holes c the plate L can be rotated horizontally in either direction and to any degree, thus changing the direction of the rod M, when by replacing the bolts b the plate L, and thereby the rod M, is held in such altered direction.

P is the support of the shaft M, at a point outside of the path of the horses, and is held in upright position by means of annular collars d d, formed on the shaft M, and placed, one on the inner side and the other on the outside of the point of bearing of such shaft M, on the support P. By this construction the support P requires no other lateral support, and adjusts itself to the annular recess between the collars d d, and precludes binding under any circumstances and avoids consequent friction. The connections in the shaft M are formed by the use of a sleeve-coupling, in the respective ends of which the adjacent ends of the sections of such shaft are securely fastened by transverse bolts, to guard against any casual displacement of such section. This connection is somewhat flexible, so that such shaft may adapt itself to any inequality of elevation in setting the power. By means of the horizontal adjustability of the shaft M the power can be set in any relation to the other machinery and the shaft M adjusted to suit; also, if it becomes necessary to move the sheller or thrasher to a new position, the same can be done without moving the power, but merely readjusting such shaft.

A pulley can be placed on the vertical shaft G, or on the horizonal shaft or rod M, and power thus transmitted by belting, in any direction, to the machinery to be operated.

What I claim as my invention, and desire to secure by Letters Patent of the United States, is—

1. In a horse-power, the combination of the frame A, a post or posts, H, disk K, and plate L, the plate L being adjustable in a horizontal plane, substantially as shown, and for the purpose described.

2. In a horse-power, the combination of the frame A, a post or posts, H, and the vertical shaft G, the latter being suitably journaled to and supported by such post, substantially as shown, and for the purpose specified.

3. In a horse-power, the combination of the frame A, post or posts H, disk K, plate L, bolts b, and shaft M, substantially as shown, and for the purpose named.

4. In a horse-power, the combination of the wheel B, pinions C, independent shafts D, bevel-wheels E, pinion F, and shaft G, substantially as shown, and for the purpose described.

5. In a horse-power, the combination of the support P, shaft M, provided with the collars d, and the plate L, substantially as shown, and for the purpose mentioned.

In testimony whereof I affix my signature in presence of two witnesses.

HARVEY PACKER.

Witnesses:
WALTER N. HASKELL,
V. S. FERGUSON.